April 30, 1957 W. T. DOYLE ET AL 2,790,550
APPARATUS FOR CENTRIFUGAL SEPARATION
Filed Oct. 25, 1954 3 Sheets-Sheet 1

INVENTORS:
William T. Doyle
Peter Hooper
M. W. Hamilton, Atty

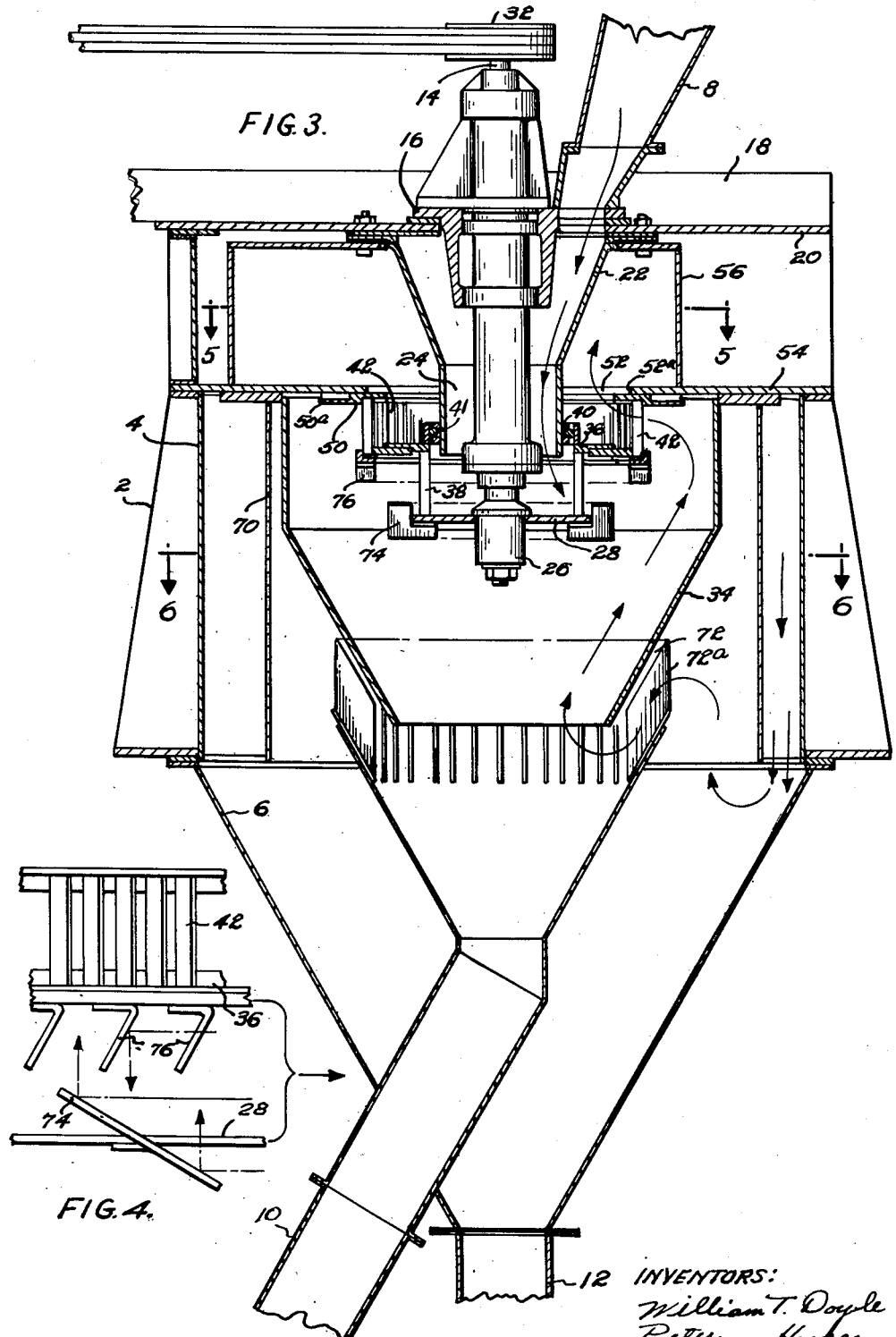

United States Patent Office 2,790,550
Patented Apr. 30, 1957

2,790,550

APPARATUS FOR CENTRIFUGAL SEPARATION

William T. Doyle, Dorchester, and Peter Hooper, Milton, Mass., assignors to Sturtevant Mill Company, Boston, Mass., a corporation of Massachusetts Application October 25, 1954, Serial No. 464,251

2 Claims. (Cl. 209—144)

This invention relates to an improved method and apparatus for centrifugal separation of finely divided materials such as, for example, limestone and various other substances which may be desired to be classified on the basis of constituent particle size.

In one general type of device heretofore employed in the art, it has been customary to utilize a rapidly rotating distributor plate whirling about a vertical axis and arranged in a position such that particles of material to be classified and separated may be fed by gravity on to the plate. Thereafter, the particles of finely divided material are acted upon by centrifugal forces and thrown radially outwardly away from the plate to lesser or greater degree, dependent upon the size and mass of the individual particles. There is also included means for producing a flow of air which operates to lift, in a vertically upward direction, some of the fine particles which have been centrifugally acted upon while permitting larger particles to fall away and pass downwardly through a discharge opening.

A very troublesome limitation is found to be present with these prior art devices. Such machines will, in most cases, operate efficiently to separate and remove particles in a range of the magnitude of, roughly, 40 microns and above, but the machines are unable to provide any worthwhile classification and recovery of particles in a smaller micron range such as, for example, particles having a micron size of from 15 microns down to as small as 5 microns or less. It happens that this particular micron size range has become of very considerable commercial significance, and there is an urgent need for a machine which will operate on a practical basis to classify and separate particles of various types of comminuted materials in a range of micron size below 40 microns and, especially, in the 15–5 micron range.

The present invention is concerned with the problem indicated and seeks to provide an improved method and apparatus for classifying and separating comminuted products. More specifically, it is the object of the invention to devise a combination of classifier mechanism elements and means for producing the flow of air currents so as to achieve a sharp classification of particles occurring in small micron sizes.

The nature of the invention and its objects will be more fully understood and appreciated from the following description of a preferred embodiment for purposes of illustration and shown in the accompanying drawings in which, Fig. 1 is a plan view of the separator apparatus of the invention;

Fig. 3 is a fragmentary enlarged vertical cross-section taken approximately centrally of the casing structure shown in Figs. 1 and 2;

Fig. 4 is a detailed fragmentary elevational view of a classifier mechanism also shown in Fig. 3;

Figure 1:
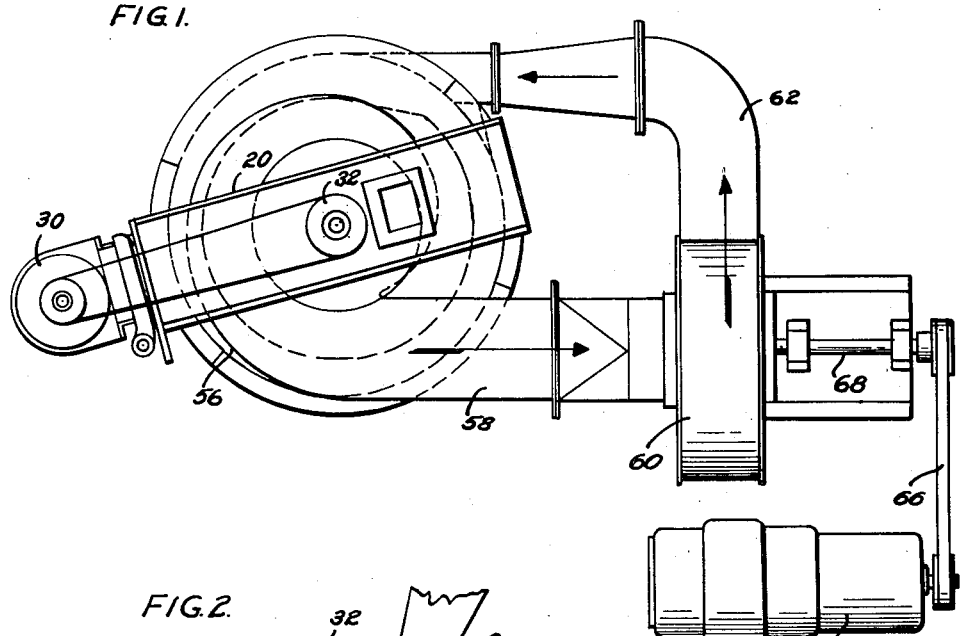

In accordance with the invention, we have found that classification and recovery of comminuted material in the 40–5 micron range may be successfully accomplished from a commercially significant standpoint by guiding particles through several independently induced air currents, all of which air currents are caused to act simultaneously and in conjunction with a centrifuging operation whereby particles become desirably pre-classified and segregated in annular zones occurring one within another.

This new classification method is based in part on the discovery that, by producing an upwardly spiralling current of air at points above and in close proximity to those regions into which particles are centrifugally displaced and by interposing rotating rejector blade elements between the centrifuged particles and the spiralling air currents, there may be exerted lifting forces of such precisely restricted intensity that only those particles in a very small micron range will be drawn through the rejector blade elements and upwardly to a suitable recovery point.

It has been found in this connection that this upwardly spiralling current of air cooperates very desirably with another flow of air continuously whirling in a circumferentially directed path of movement as a result of rotative movement of the rejector blade elements above noted. This second flow of air operates to retard in varying degree the amount of centrifugal displacement of the differently sized particles so that they tend to move and arrange themselves in concentric zones and to undergo a pre-classification step.

We have also discovered that, in conjunction with these two independently induced air streams just above described, still another air stream effect may be advantageously induced by means of two opposed air currents which are generated by blade elements acting in vertical directions from points above and below the path of radial displacement of particles. The opposed air currents and blades together function to provide for a much more efficient pre-classification.

By combining the upwardly spiralling air flow with the other air currents described, particles in the 15–5 micron range are found to be sharply segregated from relatively coarser particles and can be recovered without being accompanied, to any appreciable extent, by the relatively coarser particles.

In order to provide for removal of particles within the range of selectivity noted, we have further devised special scroll-shaped conduit means having an aperture formed with converging sides which, at one point, lead into a fan member along a horizontally directed path. We combine with this scroll-shaped conduit a distributor plate and rejector blade structure of the class referred to above so that particles may be gravity fed onto the distributor plate and caused to undergo a pre-classification step by which particles gather in concentric zones. Relatively smaller particles from the inner zones are classified by the rejector blades.

Those particles which pass through the rejector blades are lifted upwardly. The lifting forces exerted on particles in this manner are obtained by adjusting the speed of the fan at the scroll-shaped conduit to a value which will develop a pull sufficient to exceed the downward pull of the rotating rejector blades and yet limited to a value which will not draw particles of an undesirably large size through the rejector blades. The scroll-shaped conduit of the invention, when interposed between the fan and the rejector blades, functions much like a control valve for very precisely limiting the intensity of the upward air pull induced by the fan. This control valve action is derived from the fact that demand for air by the fan acts through the scroll passageway which is of converging shape and air is caused to move in an upwardly spiralling path rather than in a straight path. Therefore, particles leaving the rejector blades are necessarily carried in a spiralling air current. The lifting effect of such a spirally-induced air current is, we find, susceptible of very delicate control by adjusting the speed of the scroll fan with reference to the speed of the rejector blades.

Figure 5:
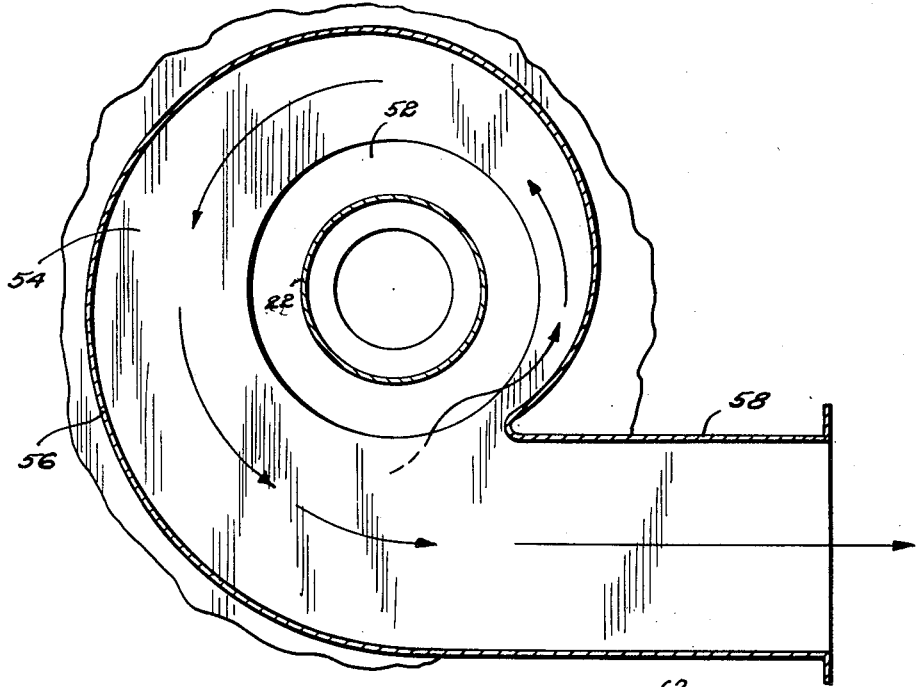
Fig. 5 is a cross-section taken on the line 5—5 of Fig. 3.
Figure 6:
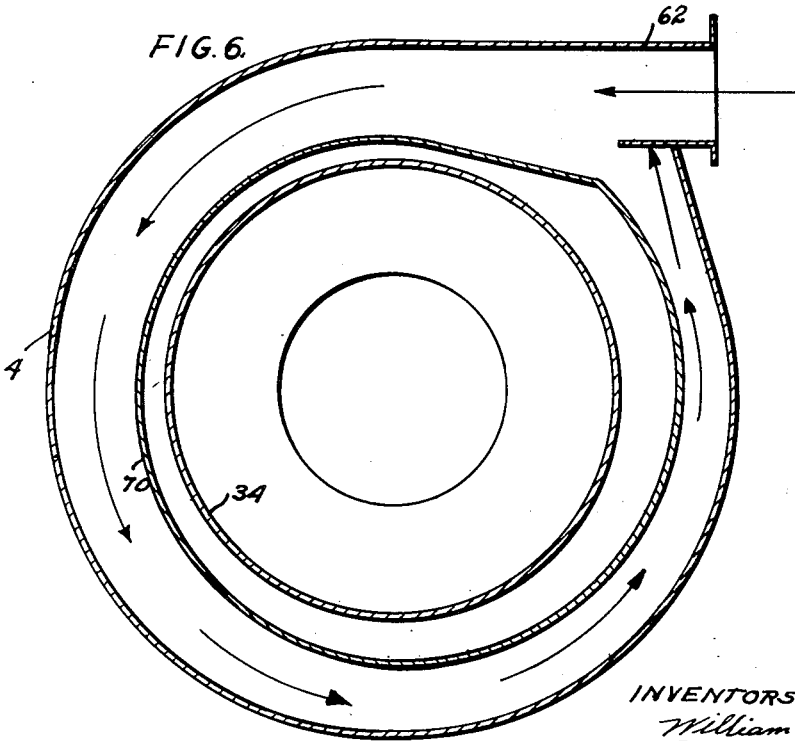
Fig. 6 is a cross-section taken on the line 6—6 of Fig. 3.

We have further devised as a component part of the classifier mechanism a second set of blades which are arranged to rotate with the rejector blades and which are adapted to induce opposed air currents acting from points above and below the zone of displacement of centrifuged particles leaving the distributor plate. We find that by regulating these several air currents it becomes possible to deal with various classes of finely divided material and still segregate in commercially significant amounts very small particles, particularly those in the 15–5 micron range. The second set of blades aids to a material extent in pre-classifying the particles in the centrifuging zone and, in particular, operates to maintain the annular zones of classification of a relatively lesser axial magnitude.

The structure shown in the accompanying drawings is intended to be illustrative of one preferred embodiment of the apparatus which we have devised for carrying out the method of the invention. As noted in the drawings, numeral 2 denotes an outer casing which includes an upper cylindrical section 4 and a lower conical ground section 6. Finely divided material is introduced into the casing through a feed inlet 8 and classified material is discharged from the casing through discharge outlets 10 and 12.

In accordance with the invention, we mount within this casing 2 scroll means and a classifier mechanism for producing independently driven air currents. Considering first the classifier mechanism, numeral 14 denotes a shaft which is supported in suitable bearing means 16 in turn fastened to a beam support 18 located at the top 20 of casing 2. Suspended from the top 20 and surrounding the shaft 14 is a tubular member 22 with which the inlet 8 communicates, thus defining an annular passageway 24 for material to pass from the feed inlet downwardly.

Fixed to a collar 26 at the lower end of the shaft 14, as shown in Fig. 3, is a particle distributor plate 28 which is located directly below the annular passageway 24 in a position to receive material passing downwardly therethrough. This plate 28 is normally rotated about a vertical axis by means of a motor 30 and a belt-driven pulley 32 secured at the upper end of the shaft 14 (Fig. 2), and the rate of speed of this distributor plate may be varied in accordance with requirements.

Consequently, it will be seen that finely divided particles of material passing down through the annular opening in response to the forces of gravity will be intercepted by the distributor plate and subjected to centrifugal forces which tend to displace the particles radially outwardly to a greater or lesser degree, dependent upon the speed of rotation of the plate and the size and mass of the particles. Under optimum conditions, the lighter or smaller particles will be displaced a relatively shorter radial distance while the heavier particles will be displaced a relatively greater radial distance, and differently sized particles tend to become segregated in annular zones so that a pre-classification step is carried out.

However, it is pointed out that, under some working conditions and when dealing with certain classes of materials, this well-known distributor plate type of centrifuging does not always produce as much pre-classification as might be desired. This is, perhaps, due to the fact that, as the annular confining space occurring around the distributor plate becomes charged with a whirling mass of particles, it becomes more difficult for the relatively coarse particles to be thrown out through this mass as far as they would otherwise travel, and some of these relatively coarse particles may be picked up and carried along in one of the concentric zones in which smaller particles tend to gather.

With this possibility in mind and in an effort to carry out a more efficient pre-classification, we have provided the second set of blades above referred to and comprising upper blades 76 and lower blades 74, as best shown in Figs. 3 and 4. The upper blades 76 are secured in spaced-apart relation to the underside of the rejector blade ring member 36 and each blade extends downwardly in an inclined position as shown. When the member 36 is rotated, the blades 76 produce a downwardly directed air stream acting against radially displaced particles. The lower blades 74 are secured in spaced-apart relation around the bottom of the distributor plate and are pitched upwardly in the manner shown in Fig. 4. Since these blades also are rotating with the distributor plate, they tend to induce flow of air upwardly in opposed relation to the flow of air from blades 76.

These two sets of blades cooperate with one another to carry out two desirable functions. In one case, the upper blades tend to drive radially displaced particles downwardly into the path of the blades 74. The latter blades are whirling at relatively high velocity and, as they strike relatively heavy or coarse particles, they hurl these coarse particles outwardly with much greater force than they would otherwise have and, in this way, the particles are caused to travel outwardly all the way through the concentric zones of whirling particles already thrown out and thus a more efficient pre-classification is accomplished.

A second function performed by the blades 74 and 76 is that of maintaining the concentric zones of differently sized particles of a relatively smaller axial magnitude, in which state a smaller selective withdrawal of fine particles can be carried out.

To selectively move very small particles away from the pre-classified material occurring in the concentric annular zones noted, we further provide the rejector blade element shown consisting of a ring member 36 supported on rods 38 attached to the plate 28. This ring member rotates with plate 28 and has a sealing ring 41 received in annular ribs 40 fast on tubular member 22. Vertically disposed around the ring 36 is a series of rejector blades 42 circumferentially spaced apart, as shown in the drawing. These rejector blades, when rotated, tend to function as a screening device for excluding some particles which may be directed thereagainst. The blades also act somewhat in the nature of a fan to induce a flow of air at points immediately outside of the edges of these fins, and this flow of air has a normal tendency to be directed downwardly.

The blades 42 are secured at their upper ends to another ring element 50 having radially projecting extremities 50*a*. As may be seen from an inspection of Fig. 3, the ring 50, at its upper side, communicates with an annular opening 52 defined by a recessed edge 52*a* formed in a separator plate 54. The edge 52*a* of plate 54 lies in spaced relationship around the tubular member 22 and, together with the member 22, constitutes an annular passageway through which particles which have passed through the rejector plates 42 may be caused to travel.

It is pointed out that, in earlier devices having an annular opening or passageway such as that just above described, it has been proposed to use a fan located above the opening. This fan had to be driven at a speed sufficient for overcoming any downward pull of the rejector blades 42. As a result, the upward pull which had to be employed actually caused both large and small particles to travel and selectivity was thus limited.

In accordance with the present invention, we provide a specially constructed conduit consisting of the scroll-shaped element 56 which extends around the tubular member 22 in a spiral path to define a converging aperture which communicates with the passageway 52 and is closed at its top side as shown. This scroll-shaped element is further illustrated in Figs. 1, 2 and 5 and, as best shown in Fig. 5, is provided at one point with a tubular part 58 extending in a horizontal direction and leading directly into the suction side of a fan 60.

When the fan 60 is operated, air, because of the converging aperture defined by the scroll-shaped element 56, is induced to follow a spiralling path rather than moving upwardly in a straight vertical path. Consequently, as the suction force can only take effect on air passing into the system from points below the classifier mechanism, the result is an upwardly spiralling flow of air. With such an upwardly spiralling flow, it is found that a relatively low fan speed can be employed to just overcome the downward pull of the rejector blades 42 and yet have a particle lifting effect of such limited intensity as to lift only very small particles.

Figure 2:
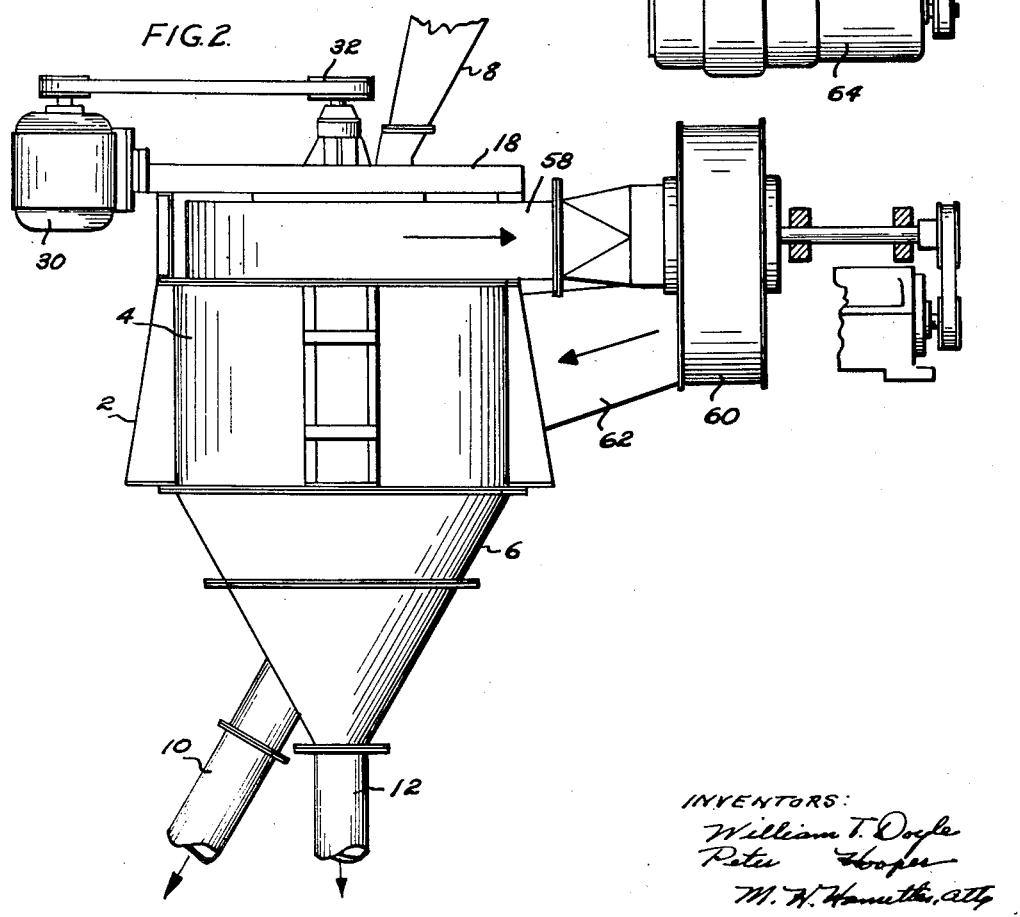
Fig. 2 is a side elevational view further illustrating the apparatus shown in Fig. 1.

Also connected to the fan 60 is a return duct 62 which connects with an opening formed in the housing 4, as best shown in Figs. 1 and 2. When the fan 60 is driven by the motor 64, belt 66 and shaft 68, the air which has been moved in an upwardly spiralling direction is drawn through the tubular part 58 and then recirculated through the return duct 62 at points within the cylindrical section of the housing which, as noted in Fig. 3, occurs in spaced relation to the drum 34. This recirculated air carries with it the fine particles which have been removed through the classifier mechanism and these particles are discharged in a downwardly directed stream around the sides of the casing sections 4 and 6 and, finally, out through the discharge outlet 12 where a suitable collecting means may be employed if desired.

We have also found that we may desire to employ a second scroll-shaped element 70 which is supported at the underside of the separator plate 54 in the manner illustrated in Fig. 3. The scroll-shaped element is positioned so that it occurs in spaced relation to both the cylindrical section 4 and the drum 34 and, as a result, this scroll-shaped member 70, together with the cylindrical section 4, defines a converging aperture which operates to induce a more positive spiralling action of particles which are passing downwardly through the casing. Air which leaves this converging aperture from the scroll-shaped member 70 may be sucked upwardly to pass between a cone-shaped opening 72 through plates 72a located around the bottom of the conical drum 34, as shown in Fig. 3. It should be understood that the scroll-shaped element 70 may or may not be employed in conjunction with the other parts described. However, the use of the scroll-shaped element 56 is essential to applicants' method and apparatus.

In practice, we have found that preferred results are obtained by driving the classifying mechanism at a relatively high speed and operating the fan at relatively low speeds. For example, in treating a sample of limestone which was about 98% finer than 44 microns and using a separator mechanism of three feet in diameter, the speed of the classifier mechanism was regulated at 2,000 R. P. M. while the fan 60 was operated at 410 R. P. M. At these settings, there was recovered a product which tested 85% in the 10–5 micron range. By regulating the speed of the outside fan to 1550 R. P. M., the product recovered, became coarser so that it tested only 80% in the 10–5 micron range.

We claim:

1. An improved centrifugal separator including a casing formed with a feed inlet for receiving a finely divided material, a material classifier mechanism, including a preclassifier device mounted within the casing, a fan located above the classifier mechanism in a position to induce flow of air upwardly through the classifier, scroll-shaped conduit means for guiding material along a spiral path of movement, and said preclassifier device including a distributor plate and two sets of blades located above and below the distributor plate.

2. An improved centrifugal separator including a casing formed with a feed inlet for receiving a finely divided material, a material classifier mechanism, including a preclassifier device mounted within the casing, a fan located above the classifier mechanism in a position to induce flow of air upwardly through the classifier, scroll-shaped conduit means for guiding material along a spiral path of movement, said classifier mechanism including a rotatable distributor plate and a blade carrying device rotatable with the plate for producing a flow of air in a direction substantially opposite to the direction of flow induced by the said fan, said blade carrying device including an upper series of radially disposed blade elements which produce a downwardly directed flow of air and a second series of radially disposed blade elements located below the said first series for inducing a flow of air in an upward direction.

References Cited in the file of this patent

UNITED STATES PATENTS 2,070.650    Crites    Feb. 16, 1937